United States Patent
Faleris et al.

(10) Patent No.: US 12,440,603 B2
(45) Date of Patent: *Oct. 14, 2025

(54) NERVE GRAFTS AND METHODS OF PREPARATION THEREOF

(71) Applicant: Axogen Corporation, Alachua, FL (US)

(72) Inventors: Jennifer Faleris, Alachua, FL (US); Kasra Tajdaran, Alachua, FL (US)

(73) Assignee: Axogen Corporation, Alachua, FL (US)

( * ) Notice: Subject to any disclaimer, the term of this patent is extended or adjusted under 35 U.S.C. 154(b) by 663 days.

This patent is subject to a terminal disclaimer.

(21) Appl. No.: 17/411,718

(22) Filed: Aug. 25, 2021

(65) Prior Publication Data
US 2022/0062505 A1 Mar. 3, 2022

Related U.S. Application Data

(60) Provisional application No. 63/071,635, filed on Aug. 28, 2020.

(51) Int. Cl.
*A61L 27/36* (2006.01)
*A61L 27/54* (2006.01)

(52) U.S. Cl.
CPC ....... *A61L 27/3675* (2013.01); *A61L 27/3604* (2013.01); *A61L 27/3687* (2013.01); *A61L 27/3695* (2013.01); *A61L 27/54* (2013.01); *A61L 2430/32* (2013.01); *A61L 2430/40* (2013.01)

(58) Field of Classification Search
None
See application file for complete search history.

(56) References Cited

U.S. PATENT DOCUMENTS

| | | | |
|---|---|---|---|
| 2003/0219417 A1* | 11/2003 | Wolfinbarger, Jr. | A61L 27/507 424/93.7 |
| 2008/0306610 A1* | 12/2008 | Wang | A61L 27/3687 623/23.72 |
| 2014/0356331 A1* | 12/2014 | Badylak | A61L 27/3675 435/268 |

FOREIGN PATENT DOCUMENTS

| CN | 106893665 A | 6/2017 |
|---|---|---|
| CN | 109602954 A | 4/2019 |

OTHER PUBLICATIONS

Cyagen Hank's Balanced Salt Solution Product Info sheet. Retrieved from URL: https://www.cyagen.com/us/en/product/Hanks-Balanced-Salt-Solution.html on Apr. 15, 2024 (Year: 2024).*
International Search Report and Written Opinion issued in International Application No. PCT/US2021/047838, issued Dec. 8, 2021 (15 pages).
Philips et al., Qualitative and Quantitative Evaluation of a Novel Detergent-Based Method for Decellularization of Peripheral Nerves, Annals of Biomedical Engineering, vol. 46, No. 11, Nov. 2018, Epublished Jul. 9, 2018, pp. 1921-1937.
Chin et al., "The proteolydc digestion of ox neurofilaments with trypsin and a-chymotrypsin", Biochemical Journal, vol. 215, No. 2, Jan. 1, 1983, pp. 239-252.
Leyla Zilic et al., "Decellularisation and Histological Characterisation of Porcine Peripheral Nerves", Biotechnology and Bioengineering, vol. 113, No. 9, Epublished Mar. 30, 2016 (Mar. 30, 2016), pp. 2041-2053.

* cited by examiner

*Primary Examiner* — Allison M Fox
(74) *Attorney, Agent, or Firm* — Bookoff McAndrews, PLLC

(57) ABSTRACT

Tissue grafts with reduced regenerative potential, methods of preparing such grafts, and related kits and methods of treatment are described. The method may include treating tissue with a digestion solution comprising trypsin, alpha-chymotrypsin (ACT) and optionally ethylenediaminetetraacetic acid (EDTA) to substantially remove one or more susceptible proteins from the tissue. The method may also include washing the treated tissue with a buffer solution and/or with a serine-containing serum. Nerve grafts prepared according to the disclosed methods may inhibit, or lessen (e.g., provide for reduced) neuroma formation and/or axonal outgrowth after implantation.

46 Claims, 5 Drawing Sheets

NERVE GRAFTS AND METHODS OF PREPARATION THEREOF

CROSS-REFERENCE TO RELATED APPLICATIONS

This patent application claims the benefit of priority to U.S. Provisional Patent Application No. 63/071,635, filed on Aug. 28, 2020, the entirety of which is incorporated herein by reference.

BACKGROUND

Peripheral nerve injuries are a major source of chronic disability. Poor management of nerve injuries can lead to painful neuroma when severed axons are unable to reestablish continuity with the distal nerve. Although nerves have the potential to regenerate after injury, this depends on the regenerating nerve fibers making appropriate contact with the severed nerve segment (and the Schwann cell basal laminae therein). In the case of severe tissue damage, axons undergoing regeneration may be unable to reach the distal nerve stump, and instead can form a tangled mass of axons and connective tissue that ultimately results in a painful bulbous neuroma. In instances where the nerve is severely damaged, e.g., a discontinuity of the damaged or severed nerve is too great to be bridged, formation of painful neuromas remains a challenge.

Current techniques used for neuroma treatment, which allows for aligned axonal outgrowth, such as suturing a nerve graft or conduit on to the end of the nerve stump do not adequately protect the nerve end from the external environment, which includes growth factors and other substances that promote axon growth. Over time, the axons therefore can grow through the graft or conduit and form a neuroma as they exit the open distal end where there is no longer a structure to facilitate aligned growth. Current commercially available products, such as nerve caps, have been used to provide a physical barrier for stunting neurite extension and nerve growth through containment of the axons. However, these devices still can lead to production of one or more painful neuroma due to the lack of internal structure in the nerve caps which can lead to extension of axons in random directions.

SUMMARY

In accordance with the present disclosure, a method for preparing a tissue graft may include treating tissue with a digestion solution comprising (a) trypsin and alpha-chymotrypsin (ACT), or (b) trypsin, ACT and ethylenediaminetetraacetic acid (EDTA), to substantially remove one or more susceptible proteins from the tissue.

The digestion solution may include about $3.5 \times 10^3$ USP units/mL to about $4.5 \times 10^3$ USP units/mL of trypsin. The digestion solution may include about 50 USP units/mL to about 55 USP units/mL of ACT. The digestion solution may include about 1.2 mM to about 1.5 mM of EDTA. The digestion solution may include about $3.5 \times 10^3$ USP units/mL to about $4.5 \times 10^3$ USP units/mL of trypsin, about 50 USP units/mL to about 55 USP units/mL of ACT, and about 1.2 mM to about 1.5 mM of EDTA. The digestion solution may further include at least one proteolytic enzyme. The one or more susceptible proteins may include laminin alpha-1, laminin alpha-2, laminin alpha-4, laminin alpha-5, laminin beta-1, laminin beta-2, laminin gamma-1, collagen IV alpha-1(IV) chain, collagen IV alpha-1/5(IV) chain, collagen alpha IV-2 chain, collagen alpha IV-3 chain, fibronectin 1 (type-iii 4, 7 domain), perlecan, nidogen-1, nidogen-2, or a combination thereof. The treated tissue may be substantially free of one or more of laminin alpha-1, laminin alpha-2, laminin alpha-4, laminin alpha-5, laminin beta-1, laminin beta-2, or laminin gamma-1. The treated tissue may be substantially free of one or more of collagen IV alpha-1(IV) chain, collagen IV alpha-1/5(IV) chain, collagen alpha IV-2 chain, or collagen alpha IV-3 chain. The treated tissue may be substantially free of one or more of fibronectin 1 (type-III 4, 7 domain), perlecan, nidogen-1, or nidogen-2. The treated tissue may include one or more of collagen I alpha-1 chain, collagen alpha-2 (I) chain, collagen alpha-3(VI) chain, lumican, collagen alpha-1(VI) chain, collagen alpha-1(XXVIII) chain, dermatopontin, collagen alpha-1(III) chain, collagen alpha-3(V) chain, keratin, type-II cytoskeletal 1, fibrillin-1, decorin, collagen alpha-1(XVI) chain, vitronectin, collagen alpha-1(XXXI) chain, myelin proteins P0, collagen alpha-2(VI) chain, collagen alpha-1(VIII) chain, collagen alpha-1 (V) chain, asporin, prolargin, biglycan, collagen alpha-1(II) chain, myelin P2 protein, periostin, collagen alpha-1(XIV) chain, alpha-crystallin B chain, or collagen alpha-1(XII) chain. The tissue may be treated with the digestion solution at a temperature ranging from about 4° C. to about 40° C. The tissue may be treated with the digestion solution for a period of time ranging from about 4 hours to about 24 hours. The method may further include washing the treated tissue with a buffer solution having a pH ranging from about 6.8 to about 7.5. The buffer solution may include phosphate buffered saline, saline catholytes, Tris-buffered saline, cacodylate buffer, Sørensen's phosphate buffer, phosphate-citrate buffer, or barbital buffer. The treated tissue may be washed with the buffer solution two or more times. The treated tissue may be washed with the buffer solution at a temperature ranging from about 4° C. to about 40° C. The treated tissue may be washed with the buffer solution for a period of time ranging from about 1 minute to about 4 hours. The method may further include washing the treated tissue with a serum comprising alpha-antitrypsin and alpha-2-macroglobulin. The serum may be fetal bovine serum, rabbit serum, goat serum, horse serum, sheep serum, porcine serum, or chicken serum. The treated tissue may be washed with the serum two or more times. The treated tissue may be washed with the serum at a temperature ranging from about 4° C. to about 40° C. The treated tissue may be washed with the serum for a period of time ranging from about 30 minutes to about 8 hours. The method may further include contacting the treated tissue with a calcium channel blocker, extracellular calcium, a glycosaminoglycan, and/or a glycoprotein, optionally wherein the buffer solution, the serum, or both the buffer solution and the serum includes the calcium channel blocker, the extracellular calcium, the glycosaminoglycan, and/or the glycoprotein. The calcium channel blocker may include one or more of cobalt $Co^{2+}$, manganese $Mn^{2+}$, lanthanum $La^{3+}$, or nitrendipine. The glycosaminoglycan may include one or more of keratin sulfate or chondroitin sulfate. The glycoprotein may include one or more myelin-associated glycoproteins. In the instance the tissue graft prepared according to the methods disclosed herein is a nerve graft, such graft may result in reduced neuroma formation and/or reduced axonal outgrowth after implantation into a patient. The tissue graft, in particular the nerve graft, may have a length between about 3 mm and about 100 mm, such as between about 5 mm and about 100 mm, or between about 15 mm and about 40 mm. The tissue graft, in particular the nerve graft may be about 1 mm to about 10 mm in diameter, such as about 1 mm to about 7 mm in diameter, or about 1 mm to about 2 mm in diameter. The tissue graft, in particular the nerve graft may define a total volume ranging from about 5 mm³ to about 55,000 mm³. The method may further include processing the tissue graft by lyophilization. The method may further include processing the tissue graft to form a paste or a gel. The tissue may be mammalian tissue, such as human tissue, non-human primate tissue, rodent tissue, equine tissue, canine tissue, rabbit tissue, porcine tissue, or ovine tissue. The tissue may be non-mammalian tissue, such as piscine tissue, amphibian tissue, insect tissue, or plant tissue. The tissue may be nerve tissue, such as peripheral nerve tissue or central nervous system tissue. The tissue may be epithelial tissue, connective tissue, or muscular tissue. The tissue may be capillary tissue, dermal tissue, skeletal tissue, smooth muscle tissue, cardiac tissue, or adipose tissue. The tissue may be synthetic tissue, including but not limited to laboratory-grown tissue.

In addition, in accordance with the present disclosure, a tissue graft may be prepared according to the methods described above. The tissue graft prepared according to the methods described above may be substantially free of one or more of laminin alpha-1, laminin alpha-2, laminin alpha-4, laminin alpha-5, laminin beta-1, laminin beta-2, laminin gamma-1, collagen iv alpha-1(IV) chain, collagen IV alpha-1/5(IV) chain, collagen alpha IV-2 chain, collagen alpha IV-3 chain, fibronectin 1 (type-iii 4, 7 domain), perlecan, nidogen-1, or nidogen-2. Such graft may be a nerve graft.

Further, in accordance with the present disclosure, a tissue graft prepared according to the methods disclosed herein may be substantially free of one or more of laminin alpha-1, laminin alpha-2, laminin alpha-4, laminin alpha-5, laminin beta-1, laminin beta-2, laminin gamma-1, collagen iv alpha-1(IV) chain, collagen IV alpha-1/5(IV) chain, collagen alpha IV-2 chain, collagen alpha IV-3 chain, fibronectin 1 (type-iii 4, 7 domain), perlecan, nidogen-1, or nidogen-2, and may include one or more of collagen I alpha-1 chain, collagen alpha-2 (I) chain, collagen alpha-3(VI) chain, lumican, collagen alpha-1(VI) chain, collagen alpha-1(XXVIII) chain, dermatopontin, collagen alpha-1(III) chain, collagen alpha-3(V) chain, keratin, type-II cytoskeletal 1, fibrillin-1, decorin, collagen alpha-1(XVI) chain, vitronectin, collagen alpha-1(XXXI) chain, myelin proteins P0, collagen alpha-2(VI) chain, collagen alpha-1(VIII) chain, collagen alpha-1(V) chain, asporin, prolargin, biglycan, collagen alpha-1(II) chain, myelin P2 protein, periostin, collagen alpha-1(XIV) chain, alpha-crystallin B chain, or collagen alpha-1(XII) chain. Such graft may be a nerve graft.

The tissue graft may be substantially free of one or more of laminin alpha-1, laminin alpha-2, laminin alpha-4, laminin alpha-5, laminin beta-1, laminin beta-2, or laminin gamma-1. The tissue graft may be substantially free of one or more of collagen IV alpha-1(IV) chain, collagen IV alpha-1/5(IV) chain, collagen alpha IV-2 chain, or collagen alpha IV-3 chain. The nerve graft may be substantially free of one or more of fibronectin 1 (type-iii 4, 7 domain), perlecan, nidogen-1, or nidogen-2. The nerve graft may include at least 0.1 nmol/g of one or more of collagen I alpha-1 chain, collagen alpha-2 (I) chain, collagen alpha-3 (VI) chain, lumican, collagen alpha-1(VI) chain, collagen alpha-1(XXVIII) chain, dermatopontin, collagen alpha-1 (III) chain, collagen alpha-3(V) chain, keratin, type-II cytoskeletal 1, fibrillin-1, decorin, collagen alpha-1(XVI) chain, vitronectin, collagen alpha-1(XXXI) chain, myelin proteins P0, collagen alpha-2(VI) chain, collagen alpha-1(VIII) chain, collagen alpha-1(V) chain, asporin, prolargin, biglycan, collagen alpha-1(II) chain, myelin P2 protein, periostin, collagen alpha-1(XIV) chain, alpha-crystallin B chain, or collagen alpha-1(XII) chain. The tissue graft may include one or more calcium channel blockers, extracellular calcium, glycosaminoglycans, or glycoproteins. The calcium channel blockers may include one or more of cobalt $Co^{2+}$, manganese $Mn^{2+}$, lanthanum $La^{3+}$, or nitrendipine. The glycosaminoglycans may include one or more of keratin sulfate or chondroitin sulfate. The glycoproteins may include one or more myelin-associated glycoproteins. The tissue graft, in particular a nerve graft, may have a length between about 3 mm and about 100 mm. The tissue graft, in particular a nerve graft, may be about 1 mm to about 10 mm in diameter, such as about 1 mm to about 7 mm in diameter, or about 1 mm to about 2 mm in diameter. The tissue graft, in particular a nerve graft, may define a total volume ranging from about 5 mm³ to about 55,000 mm³.

Still further, in accordance with the present disclosure a method of treating a patient may include introducing the tissue graft as described above into the patient.

The nerve graft may inhibit neuroma formation. The nerve graft may maintain axonal alignment through the nerve graft. The nerve graft may inhibit neurite extension into the nerve graft. The patient may be a human or a non-human animal.

In addition, in accordance with the present disclosure, a kit for preparing a nerve graft may include tissue, trypsin, and alpha-chymotrypsin (ACT).

The kit may further include ethylenediaminetetraacetic acid (EDTA). The kit may include a first container that includes the trypsin and the EDTA, and a second container that includes the ACT. The kit may include a buffer solution. The buffer solution may include phosphate buffered saline, saline catholytes, Tris-buffered saline, cacodylate buffer, Sørensen's phosphate buffer, phosphate-citrate buffer, or barbital buffer. The kit may further include a serum that includes alpha-antitrypsin and alpha-2-macroglobulin. The serum may be fetal bovine serum, rabbit serum, goat serum, horse serum, sheep serum, porcine serum, or chicken serum. The kit may further include instructions for preparing a digestion solution comprising the trypsin and the ACT, or a digestion solution comprising the trypsin, the ACT, and ethylenediaminetetraacetic acid (EDTA). The kit may further include instructions for treating the tissue with the digestion solution. The tissue may be mammalian tissue, such as human tissue, non-human primate tissue, rodent tissue, equine tissue, canine tissue, rabbit tissue, porcine tissue, or ovine tissue, or non-mammalian tissue, such as piscine tissue, amphibian tissue, or insect tissue, or synthetic tissue such as but not limited to laboratory-grown tissue. The tissue may be plant tissue. The tissue may be nerve tissue, such as peripheral nerve tissue or central nervous system tissue, or may be epithelial tissue, connective tissue, or muscular tissue. The tissue may be capillary tissue, dermal tissue, skeletal tissue, smooth muscle tissue, cardiac tissue, or adipose tissue.

Further, in accordance with the present disclosure, a method for preparing a nerve graft may include treating biological soft tissue with a digestion solution comprising trypsin, alpha-chymotrypsin (ACT) and ethylenediaminetetraacetic acid (EDTA), washing the treated tissue one or more times with a buffer solution, and after washing with the buffer solution, washing the treated tissue one or more times with a serum comprising alpha-antitrypsin and alpha-2-macroglobulin, wherein the treated tissue is substantially free of one or more of laminin alpha-2, laminin alpha-4, laminin alpha-5, laminin beta-1, laminin beta-2, laminin gamma-1, collagen IV alpha-1(IV) chain, collagen IV alpha-1/5(IV) chain, collagen alpha IV-2 chain, collagen alpha IV-3 chain, fibronectin 1 (type-III 4, 7 domain), perlecan, nidogen-1, or nidogen-2, and wherein the treated tissue includes one or more of collagen I alpha-1 chain, collagen alpha-2 (I) chain, collagen alpha-3(VI) chain, lumican, collagen alpha-1(VI) chain, collagen alpha-1(XXVIII) chain, dermatopontin, collagen alpha-1(III) chain, collagen alpha-3(V) chain, keratin, type-II cytoskeletal 1, fibrillin-1, decorin, collagen alpha-1(XVI) chain, vitronectin, collagen alpha-1(XXXI) chain, myelin proteins P0, collagen alpha-2(VI) chain, collagen alpha-1(VIII) chain, collagen alpha-1(V) chain, asporin, prolargin, biglycan, collagen alpha-1(II) chain, myelin P2 protein, periostin, collagen alpha-1(XIV) chain, alpha-crystallin B chain, or collagen alpha-1(XII) chain.

One of ordinary skill in the art will appreciate that the regenerative potential-attenuated processed nerve grafts disclosed herein may be used in the surgical interventions of humans and other vertebrates, as well as in laboratory studies, comparisons and assays.

One of ordinary skill in the art will appreciate that starting materials, biological materials, reagents, synthetic methods, purification methods, analytical methods, assay methods, and biological methods other than those specifically exemplified can be employed in the practice of the disclosure without resort to undue experimentation. All art-known functional equivalents, of any such materials and methods are intended to be included in this disclosure.

The singular forms "a," "an," and "the" include plural reference unless the context dictates otherwise. The terms "approximately" and "about" refer to being nearly the same as a referenced number or value. As used herein, the terms "approximately" and "about" generally should be understood to encompass±5% of a specified amount or value.

The terms and expressions which have been employed are used as terms of description and not of limitation, and there is no intention that in the use of such terms and expressions of excluding any equivalents of the features shown and described or portions thereof, but it is recognized that various modifications are possible within the scope of the disclosure claimed.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
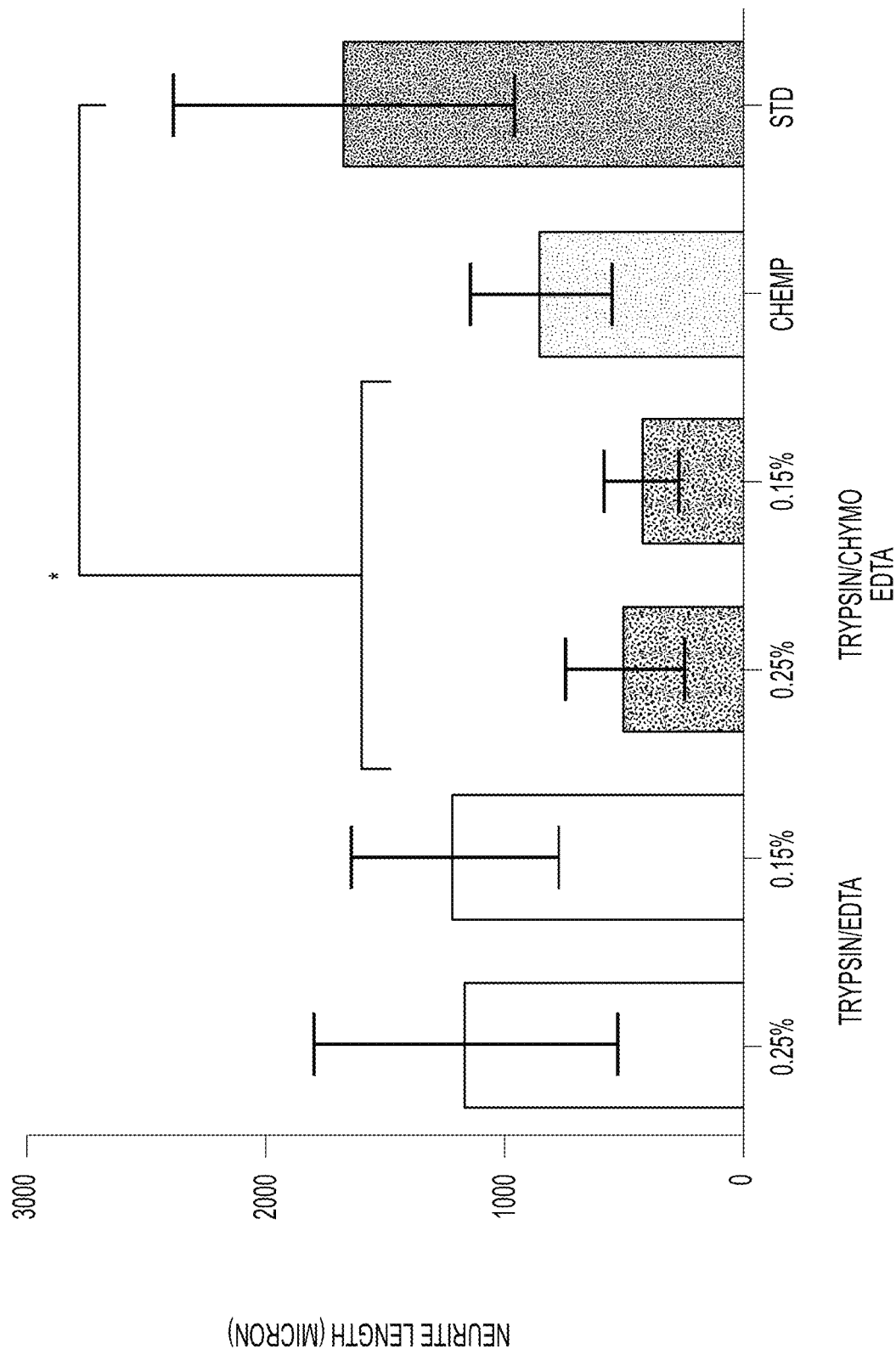
FIG. 1 is a bar graph of neurite outgrowth measurements for nerve graft samples, as discussed in Example 2.

The present disclosure relates to the preparation of nerve grafts with reduced regenerative potential, e.g., lower content of certain biochemical compounds associated with regenerative potential. For example, the present disclosure includes methods of treating tissue to reduce, remove, denature, or inactivate at least a portion of its basement membrane proteins. Use of these materials as nerve grafts, as opposed to grafts that contain such functional basement membrane proteins, may provide significantly reduced neuroregenerative activity after implantation, for example, via reduction in neurite outgrowth and/or the formation of smaller, fewer, less painful neuromas, or the absence of neuromas.

In at least one aspect, the methods herein include treating tissue with a digestion solution comprising trypsin, alpha-chymotrypsin (ACT), and optionally ethylenediaminetetraacetic acid (EDTA). Treating the tissue with such solutions may selectively remove, digest, and/or inactivate at least a portion of basement membrane proteins within the tissue without significantly affecting other proteins within the tissue. The treated tissue may undergo one or more washing steps with a buffer solution and/or serine-containing serum, and optionally may be further treated with one or more additives such as calcium channel blockers, extracellular calcium, glycosaminoglycans and/or glycoproteins to further decrease the regenerative potential of the nerve graft.

In nerve tissue, the basement membrane is a sheet-like layer that surrounds and separates neural cells including the peripheral nerve axons and Schwann cells from underlying connective tissue and extracellular matrix (ECM). The basement membrane comprises proteins including, but not limited to, laminin (e.g., laminin alpha-1, laminin alpha-2, laminin alpha-4, laminin alpha-5, laminin beta-1, laminin beta-2, laminin gamma-1), collagen (e.g., collagen IV alpha-1(IV) chain, collagen IV alpha-1/5(IV) chain, collagen alpha IV-2 chain, collagen alpha IV-3 chain), fibronectin (e.g., fibronectin 1 (type-III 4,7 domain)), perlecan, and nidogen (e.g., nidogen-1, nidogen-2). Other types of tissues also include a basement membrane with these proteins. These proteins are believed to contribute to the regenerative capacity of the tissue.

As discussed further below, the methods herein may substantially remove or otherwise reduce the concentration of basement membrane proteins while keeping the remainder of the tissue intact. With respect to nerve tissue, for example, such basement membrane proteins being reduced in concentration are associated with neurite extension and nerve regeneration, while portions that remain intact include proteins that are not involved in regeneration and that are present in the ECM. As used herein, the term "susceptible protein" refers to basement membrane proteins that are cleaved, denatured, or otherwise deactivated by trypsin, ACT, or both. For example, the methods herein may remove at least a portion of one or more of the following basement membrane proteins: laminin alpha-1, laminin alpha-2; laminin alpha-4; laminin alpha-5; laminin beta-1; laminin beta-2; laminin gamma-1; collagen IV alpha-1(IV) chain; collagen IV alpha-1/5(IV) chain; collagen alpha IV-2 chain; collagen alpha IV-3 chain; fibronectin 1 (type-III 4, 7 domain); perlecan; nidogen-1; and/or nidogen-2. Such susceptible proteins may be removed partially or entirely from the tissue while extracellular matrix proteins and the structure of the tissue remains substantially intact. As used herein, being "substantially free" of a protein means that the tissue (treated tissue) or nerve graft comprises less than about 0.1 nmol/g of the protein, based on the mass of the respective tissue (treated tissue) or graft.

According to aspects of the present disclosure, tissue used to prepare the grafts may be processed to remove cellular and non-cellular materials, including components that induce or are otherwise associated with an immune response. For example, human tissue or other animal, e.g., mammal or non-mammal, tissue may be processed to remove cellular and non-cellular components such as cells, fat, blood, and/or axonal debris while preserving the three-dimensional structure of the tissue (e.g., tubular structure of nerve tissue). In some examples, the graft is prepared from acellular tissue, e.g., acellular nerve tissue.

The methods herein include treating any tissue with a basement membrane, like nerve tissue (e.g., cellular, decellularized and/or acellular tissue) with digestion solutions comprising at least trypsin and ACT, for example a digestion solution comprising trypsin, ACT, and EDTA. The digestion solution may be prepared by combining the trypsin, ACT, and EDTA in any order, for example combining trypsin and EDTA and then adding ACT, or combining trypsin and ACT and then adding EDTA. Optionally, the digestion solution comprises at least one additional proteolytic enzyme.

According to some examples of the present disclosure, the concentration of trypsin may range from about $3.5 \times 10^3$ USP units/mL to about $7.0 \times 10^3$ USP units/mL, such as about $3.5 \times 10^3$ USP units/mL to about $4.5 \times 10^3$ USP units/mL, about $4.0 \times 10^3$ USP units/mL to about $4.5 \times 10^3$ USP units/mL, or about $4.5 \times 10^3$ USP units/mL to about $6.0 \times 10^3$ USP units/mL. Further, for example, the concentration of ACT may range from about 45 USP units/mL to about 60 USP units/mL, such as from about 50 units/mL to about 50 units/mL. The concentration of EDTA may range, for example, from about 1.0 mM to about 2.5 mM, such as about 1.2 mM to about 1.5 mM, or about 1.5 mM to about 2.0 mM. In at least one example, the digestion solution comprises about $3.5 \times 10^3$ USP units/mL to about $4.5 \times 10^3$ USP units/mL of trypsin, about 50 USP units/mL to about 55 USP units/mL of ACT, and about 1.2 mM to about 1.5 mM of EDTA.

The digestion solution, expressed in terms of % trypsin content, may comprise from about 0.01% trypsin (e.g., 0.01% trypsin/ACT/EDTA solution) to about 0.3% or more trypsin (e.g., 0.3% or more trypsin/ACT/EDTA solution), such as about 0.05% to about 0.25%, about 0.1% to about 0.20%, about 0.15% to about 0.18%, about 0.2% to about 0.25%, about 0.10% to about 0.20%, about 0.5% to about 0.12% trypsin.

The duration of incubation of the tissue in the digestion solution may be at least 2 hours, e.g., from about 2 hours to about 4 hours, from about 4 hours to about 24 hours, from about 6 hours to about 12 hours, or from about 10 hours to about 16 hours. Suitable temperatures may range from about 4C to about 40C, such as about 4C to about 37C, about 4C to about 25C, about 20C to about 35C, wherein lower temperatures are suitable for longer incubation times. In at least one example, the tissue is treated with a digestion solution at a temperature of about 37° C. to about 40° C. for a period of about 2 hours to about 4 hours. In further examples, the tissue may be treated with a digestion solution at a temperature between about 35° C. and about 40° C. for a period of time between about 4 hours and about 6 hours, or at a temperature between about 4° C. and about 15° C. for a period of time between about 18 hours and about 24 hours. While exemplary ranges of durations and temperatures are listed herein, in general, as the incubation temperature decreases, the duration of the incubation may increase. The duration of digestion and the corresponding time would be appreciated by and within the skill of those in the art. The incubation of the tissue in the digestion solution may be undertaken with agitation.

Following treatment with the digestion solution, the treated tissue may be washed one or more times with a buffer solution. For example, the buffer solution may have a pH in the range of about 6.8 to about 7.6, such as about 7.2 to about 7.6, about 7.3 to about 7.5, e.g., a pH of about 7.4. Exemplary buffer solutions suitable for washing the treated tissue (following treatment in the digestion solution) include, but are not limited to, phosphate buffered saline (PBS), saline catholytes, Tris-buffered saline, cacodylate buffer, Sørensen's phosphate buffer, phosphate-citrate buffer, and barbital buffer. The buffer solution may neutralize pH and remove enzymes and/or other components of the digestion solution. Washing the treated tissue with the buffer solution may avoid degradation of the tissue upon extended exposure to the enzymes in the digestion solution. For example, the buffer solution may neutralize residual trypsin, ACT, and EDTA present in the tissue. The treated tissue may be washed with the buffer solution (or different buffer solutions) one or more times, including 2, 3, 4, 5, 6, 7, 8, 9, or 10 times or more. The number of washes suitable for a given tissue may depend on the size of the tissue or (nerve graft to be prepared from the treated tissue), its density, the use of and degree of agitation with the washing, and/or other factors, to substantially neutralize the pH of the tissue.

The treated tissue additionally may be washed one or more time with a serine-containing serum, such as an animal-derived serum, e.g., fetal bovine serum (FBS), rabbit serum, goat serum, horse serum, sheep serum, porcine serum, or chicken serum. The serine-containing solution may comprise one or more serine components, such as alpha-antitrypsin and/or alpha 2 macroglobulin (A2M), in an amount sufficient to inactivate residual trypsin, ACT, and EDTA in the tissue following treatment with the digestion solution. For example, in a case in which FBS is used as the animal-derived serum in the step(s) of washing the treated tissue, the FBS may have an osmolarilty from 280 mOsm/kg to 340 mOsm/kg, or of from 300 mOsm/kg to 320 mOsm/kg. The treated tissue may be washed with the serine-containing serum one or more times, including 2, 3, 4, 5, 6, 7, 8, 9, or 10 times or more. The duration of incubation for each wash and the number of washes suitable for a given tissue may depend on the size of the tissue, its density, the use of and degree of agitation with the washing, and/or other factors, to substantially inactivate and remove at least residual trypsin, ACT, and EDTA from the tissue. For example, a tissue having a greater size and/or a greater density may require a relatively greater number of washes and/or a greater duration of washes.

The tissue may be washed one or more times in the serine-containing serum, e.g., FBS, after washing the tissue with the buffer solution. In at least one example, the treated tissue is washed with a buffer solution one or more times as discussed above, and then placed in FBS or other serine-containing serum and incubated for a period of time between about 30 minutes and about 24 hours, e.g., between about 30 minutes and about 8 hours, between about 45 minutes and about 1 hour, between about 1 hours and about 24 hours, between about 4 hours and about 12 hours, between about 8 hours and about 16 hours, or between about 12 hours and about 24 hours. Temperatures suitable for incubation in the serine-containing serum may range from about 4° C. to about 37° C., e.g., about 10° C. to 35° C., about 15° C. to about 30° C., or about 22° C. to about 28° C., depending on the length of incubation. For example, the tissue may be treated for a period of time ranging from about 45 minutes to about 24 hours at a temperature ranging from about 4° C. to about 37° C., wherein lower temperatures (e.g., about 4° C. to about 22° C.) are suitable for longer durations of incubation (e.g., 12 hours to about 24 hours), and higher temperatures (e.g., about 23° C. to about 37° C.) are suitable for shorter periods of incubation (e.g., 45 minutes to about 11 hours). In at least one non-limiting example, the treated tissue is washed with the serine-containing serum at a temperature of about 37° C. for 45-60 minutes.

In addition to separate washes with buffer solution and serine-containing serum, or as an alternative, the treated tissue may be washed with the serine-containing serum at the same time as washing with the buffer solution. For example, the treated tissue may be washed with a buffer solution that comprises serine components, e.g., alpha-antitrypsin and/or A2M. Such combined solution may comprise, for example, PBS and FBS. The relative amounts of the PBS (or other buffer solution) and the FBS (or other serine-containing serum) may be determined based on one or more factors, such as the size of the tissue, its density, the use of and degree of agitation with the washing, as mentioned above. For example, a volume of the PBS (or other buffer solution) may proportionally increase as a size and/or a density of the tissue increases. In some examples, the tissue may be washed with a combined buffer/serine-containing solution before and/or after an individual wash or multiple washes with buffer solution and/or serine-containing serum.

Optionally, the tissue graft, particularly a nerve graft, may be produced by further exposing the treated and washed tissue with one or more additives, e.g., to further assist in decreasing regenerative potential. Exemplary additives include, but are not limited to, calcium channel blockers, also referred to as calcium permeability blockers, (such as, e.g., cobalt $Co^{2+}$, manganese $Mn^{2+}$, lanthanum $La^{3+}$, and nitrendipine), extracellular calcium, glycosaminoglycans (including but not limited to keratin sulfate and/or chondroitin sulfate), and glycoproteins (including but not limited to myelin-associated glycoprotein). The amount of the additive may range from about 0.1 mM to about 1000 M, such as from about 1 mM to about 500 M, about 0.1 M to about 250 M, about 0.5 M to about 100 M, about 5 M to about 50 M, about 0.1 mM to about 50 mM, about 10 mM to about 100 mM, or about 0.5 M to about 10 M, about 25 M to about 250 M.

The additive(s) may be added to a solution, such as a pH neutral solution, e.g., having a pH from about 6.8 to about 7.6. The additive(s) may be added to any of the above digestion solutions, buffer solutions, and/or serine-containing serums during treatment and/or washing of the treated tissue, and/or the graft may be produced by further exposing the treated and washed tissue to the additive(s) during its final wash, or thereafter. Additionally or alternatively, the additive(s) may be added to the graft prior to storage and/or after removal from storage in a pH neutral solution (e.g., pH from about 6.8 to about 7.6), optionally a buffer solution, following treatment according to the methods herein. Thus, for example, the tissue graft, for example a nerve graft, may comprise the additive(s) at the time of its use in a medical procedure.

Once treated with digestion solution and washed as discussed above, and optionally including one or more additives, the treated tissue may be stored. The resulting graft may be in wet form, frozen form, or lyophilized form. According to some aspects of the present disclosure, the nerve graft is further processed by lyophilization. During lyophilization, the pressure, water content, and/or temperature may be controlled to maintain desired internal microstructures of the nerve graft. According to some aspects, the nerve graft is further processed to form a gel or a paste. For example, a polymerizing factor may be used to prepare a gel or paste from tissue that has been treated with a digestion solution according to the methods herein. The gel or paste may have a similar elastic modulus as that of the nerve(s) to be treated to prevent or minimize mechanical compression of the nerve(s), which can lead to further formation of neuroma.

Following treatment according to the methods herein, the graft (optionally processed by lyophilization, or processed to form a gel or a paste) may be placed in a storage container that is then maintained at a temperature ranging from about −80° C. to room temperature (about 20-22° C.). The storage container may be amenable to flash freezing and maintenance at −80° C., or lower, for weeks, months or years. The storage container may also be substantially air-tight and backfilled with inert gas. In some examples, the tissue is treated as disclosed herein (e.g., with a digestion solution, and one or more washes with a serine-containing serum that may include a buffer solution, and optionally with additional washes comprising buffer solution) and then transferred to a buffer solution, e.g., a buffered saline solution, having a pH in the range of about 7.2 to about 7.6, e.g., a pH of about 7.3 to about 7.5, such as a pH of about 7.4, for storage prior to use in a medical procedure. Exemplary buffer solutions suitable for storing the grafts prepared according to the methods herein include, but are not limited to, PBS, saline catholytes, Tris-buffered saline, cacodylate buffer, Sørensen's phosphate buffer, phosphate-citrate buffer, and barbital buffer. The buffer solutions used to store the grafts may comprise one or more additives, as discussed above (e.g., one or more calcium channel blockers, extracellular calcium, glycosaminoglycans, glycoproteins, or combinations thereof).

It has surprisingly been found that incubation of the tissue with digestion solutions as disclosed herein is selective, and decreases the amount of the basement membrane proteins within the tissue, while having substantially no measurable impact on the amount of proteins present in ECM. As an example, 60% to 100%, or 80% to 100%, of an amount of the basement membrane proteins within the tissue may be removed, for example, deactivated and/or denatured, as a result of incubation with digestion solutions. By virtue of the decrease of the basement membrane proteins, the basement membrane proteins of the processed tissue may be "deactivated," meaning that the processed tissue may be prevented from supporting and/or decreased in its ability to support nerve regeneration, either in vitro or when the processed tissue is implanted in a subject. The digestion process with trypsin, ACT, and EDTA may substantially remove, for example, one or more of the following susceptible basement membrane proteins: laminin alpha-1, laminin alpha-2; laminin alpha-4; laminin alpha-5; laminin beta-1; laminin beta-2; laminin gamma-1; collagen IV alpha-1(IV) chain; collagen IV alpha-1/5(IV) chain; collagen alpha IV-2 chain; collagen alpha IV-3 chain; fibronectin 1 (type-iii 4, 7 domain); perlecan; nidogen-1; and/or nidogen-2. In at least one example, the treated tissue and/or graft prepared from the treated tissue is substantially free of one or more proteins susceptible to cleavage by trypsin and/or ACT. The same digestion process may have substantially no measurable impact on, for example, one or more of the following proteins, which may be referred to as non-susceptible proteins: collagen I alpha-1 chain; collagen alpha-2 (I) chain; collagen alpha-3(VI) chain; lumican; collagen alpha-1(VI) chain; collagen alpha-1(XXVIII) chain; dermatopontin; collagen alpha-1(III) chain; collagen alpha-3(V) chain; keratin; type-II cytoskeletal 1; fibrillin-1; decorin; collagen alpha-1 (XVI) chain; vitronectin; collagen alpha-1(XXXI) chain; myelin proteins P0; collagen alpha-2(VI) chain; collagen alpha-1(VIII) chain; asporin; collagen alpha-1(V) chain; prolargin; biglycan; collagen alpha-1(II) chain; myelin P2 protein; periostin; collagen alpha-1(XIV) chain; alpha-crystallin B chain; and/or collagen alpha-1(XII) chain. For example, following treatment with the digestion solution, the treated tissue and/or graft prepared from the treated tissue may comprise 0.1 nmol/g or more of a non-susceptible protein, such as, e.g., 0.15 nmol/g or more, or 0.2 nmol/g or more of a non-susceptible protein.

The degree of digestion and the amount of susceptible proteins remaining in the tissue after the digestion process may depend on parameters employed in the digestion process, such as, e.g., the concentration of trypsin, ACT, and/or EDTA, the amount of time provided for incubation in the digestion solution, the inclusion of additives as additional regenerative potential attenuators, and/or properties of the graft, such as the tissue density and/or the amounts of basement proteins present in the tissue, the degree and use of agitation, the temperature at which the digestion process is undertaken. For example, as a concentration of the digestive enzymes increases, more susceptible proteins, including the basement membrane proteins, may be removed from a relatively large volume of tissue. Increasing a digestion time will, in turn, increase a rate of digestion. In some aspects, increasing a temperature at which digestion occurs may increase the rate of susceptible protein digestion. In some instances, the digestion process decreases the amount of one or more of the susceptible proteins, to the point of no longer being detectable by quantitative measurement techniques such as tandem mass spectrometry (MS/MS) with or without high-performance liquid chromatography (HPLC), liquid chromatography-selected reaction monitoring (LC-SRM), enzyme-linked immunosorbent assay (ELISA), and multiplex protein detection techniques such as fast protein liquid chromatography (FPLC). In some instances, no susceptible proteins are detectable in the treated tissue and/or graft prepared from the treated tissue.

The tissue processing methods described herein, with respect to nerve grafts, may provide nerve grafts having at least a 2-fold loss of neuroregenerative activity as compared to the tissue before treatment with the digestion solution and/or as compared to a reference untreated tissue. The degree of decreased regenerative potential may be at least 3 fold, at least 4 fold, at least 5 fold, at least 6 fold, at least 7 fold, at least 8 fold, at least 9 fold, at least 10 fold, at least 12 fold, at least 13 fold, at least 14 fold, at least 15 fold, at least 16 fold, at least 17 fold, at least 18 fold, at least 20 fold, or at least 50 fold, for example. The degree of decreased regenerative potential may be ascertained by suitable analytical techniques such as, e.g., MS/MS with or without HPLC, ELISA, FPLC, or a biological assay, such as but not limited to an assay evaluating neurite extension activity from a cluster of neurons or a neural cell line into the nerve grafts or a derivative of the nerve graft, as compared with a control.

The tissue suitable for processing according to the methods herein may be natural or synthetic. For example, the tissue may be soft biological tissue obtained from an animal, such as a mammal, including a human or a non-human mammal, or a non-mammal, including a fish, amphibian, or insect. The tissue may be plant tissue. The graft may be allogeneic or xenogeneic to a patient into which the graft is implanted. The tissue may be nerve tissue, including, for example, peripheral nerve tissue or central nervous system tissue. Other types of tissue suitable for the present disclosure include, but are not limited to epithelial tissue, connective tissue, muscular tissue, capillary tissue, dermal tissue, skeletal tissue, smooth muscle tissue, cardiac tissue, and adipose tissue. As mentioned above, the soft biological tissue may be mammalian tissue, including human tissue and tissue of other primates, rodent tissue, equine tissue, canine tissue, rabbit tissue, porcine tissue, or ovine tissue. In addition, the tissue may be non-mammalian tissue, selected from piscine, amphibian, or insect tissue. The tissue may be a synthetic tissue, such as but not limited to laboratory-grown tissue. According to some examples, the tissue is nerve tissue obtained from an animal, such as a human or a non-human mammal.

Also contemplated herein are immunosuppressive techniques before and/or after implantation in a patient. For example, a patient may be administered one or more immunosuppressive agents in conjunction to implantation of the graft. For example, the graft may comprise one or more immunosuppresive agents that are delivered to the patient through the graft.

The treated tissue and/or graft prepared from the treated tissue may have dimensions suitable for treating nerve damage of a patient. For example, the treated tissue and/or graft may have a length between about 3 mm and about 100 mm, such as between about 5 mm and about 100 mm, between about 20 mm about 50 mm, between about 45 mm and about 75 mm, or between about 15 mm to about 40 mm in length. Further, for example, the graft may define a total volume ranging from about 5 $mm^3$ to about 55,000 $mm^3$, such as about 100 $mm^3$ to about 25,000 $mm^3$, about 500 $mm^3$ to about 10,000 $mm^3$, about 1,000 $mm^3$ to about 5,000 $mm^3$, about 500 $mm^3$ to about 2,000 $mm^3$, about 100 $mm^3$ to about 5000 $mm^3$, or about 7,500 $mm^3$ to about 15,000 $mm^3$.

The nerve grafts herein may be implanted into a patient to, among other things, reduce or minimize axonal regeneration, lessen the size or number of neuromas formed at the site after implantation, slow neuroma formation, and/or prevent neuroma formation altogether. The nerve graft may be used in place of, or in combination with a nerve cap, such as the devices described in U.S. Pat. Nos. 9,629,997, 10,952, 806, 10,945,805, U.S. Patent Appln. Publn. No. 2021/0186645, and U.S. Patent Appln. Publn. No. 2021/0161611. The patient may be a human or a non-human animal.

Nerve grafts prepared according to the methods herein may exhibit reduced neuroma formation and/or reduced axonal outgrowth. The nerve grafts herein may inhibit neuroma formation and/or inhibit neurite extension. Inhibit as used herein includes reducing, minimizing, slowing, and/or preventing neuroma formation and/or neurite extension.

Digestion solutions according to the present disclosure may be prepared from a kit. For example, the kit for preparing the nerve graft of attenuated regenerative potential may comprise one or more tissues and components of the digestion solution, e.g., trypsin, ACT, and EDTA. Further components may include, for example, reagents used for the undertaking of washes, such as, e.g., one or more buffer solutions, serine-containing serums, or a combination buffer/serine-containing solution. Optionally, the kit may include one or more additives to which the tissue is to be exposed after digestion and one or more washes, such as a calcium channel blocker, extracellular calcium, a glycosaminoglycan, and/or a glycoprotein. The tissue and reagents of the kit may be packaged in aqueous media or in lyophilized form. The kit may also include one or more containers, vessels, or tubes, in which the tissue can be treated and/or stored, and may include instructions for preparing the digestion solution and/or treating the tissue according to suitable parameters such as time, temperature, digestion solution concentrations, etc.

According to some aspects of the present disclosure, the kit includes at least one vial, test tube, flask, bottle, syringe or other suitable container into which the nerve graft(s) and reagents may be placed or suitably aliquoted. The kits of the present disclosure may provide the reagent containers in close confinement for commercial sale. Such containers may include injection or blow-molded plastic containers into which one or more vials are retained. The kit may also contain a vessel or other suitable container for storing the graft following treatment with the reagents.

EXAMPLES

The disclosure may be further understood by the following non-limiting examples. The examples are intended to illustrate the above disclosure and should not be construed as to narrow its scope. One skilled in the art will readily recognize that the examples suggest many other ways in which the disclosure could be practiced. It should be understood that numerous variations and modifications may be made while remaining within the scope of the disclosure.

Example 1: Soft Tissue Digestion

The purpose of this experiment was to test a digestion protocol on model nerve tissue and digestion of basement membrane proteins while maintaining physical and microstructural integrity of the tissue. The model nerve tissue was Avance® Nerve Grafts (1-2 mm) manufactured by Axogen, Inc. (Alachua, FL, US).

A stock solution of trypsin/EDTA (0.15%) was prepared by combining 6.6 mL stock trypsin/EDTA (0.25%) (Fisher Scientific, Hampton, NH, USA) and 4.4 mL sterile double distilled water in a 15 mL conical tube. The trypsin in the trypsin/EDTA (0.25%) commercially available stock solution was 2700 units/mg USP.

Digestion solutions of trypsin/ACT/EDTA were prepared by adding 16.5 mg and 27.5 mg of dry powder ACT (Fisher Scientific, Hampton, NH, USA) to 11 mL of each of the 0.15% and 0.25% trypsin/EDTA stock solutions, respectively, and mixing by gentle shaking and inverting the 15 ml conical tubes. The ACT was reported as 35 USP units/mg. The 0.15% digestion solution included about $4.1 \times 10^3$ USP units/mL trypsin, about 52.5 USP units/mL ACT, and about 1.3 mM EDTA; Table 1 lists the chemical composition. The 0.25% digestion solution included about $6.8 \times 10^3$ USP units/mL trypsin, about 87.5 USP units/mL ACT, and about 3.6 mM EDTA.

TABLE 1

| DIGESTION SOLUTION (0.15%) | |
|---|---|
| Components | Concentration (mg/L) |
| D-Glucose | 600.00 |
| EDTA•4Na•2H$_2$O | 552.00 |
| KCl | 240.00 |
| KH$_2$PO$_4$ | 36.00 |
| NaCl | 4800.00 |
| NaHCO$_3$ | — |
| Na$_2$HPO$_4$ (anhydrous) | 28.62 |
| Phenol red•Na | 6.00 |
| Trypsin | 1500.00 |
| α-chymotrypsin (ACT) | 1500.00 |

Each sample of Avance® Nerve Graft was thawed and cut into approximately 3 mm segments using a Zivic cutting board (Zivic Instruments, Pittsburgh, PA, USA). The segments were then placed into 1.5 mL centrifuge tubes along with 100 μL of digestion solution, and incubated 2 hours at 37° C. The digestion solution was then aspirated using a bulb type transfer pipette and the grafts washed three times with 1 mL of sterile phosphate-buffered saline (PBS). An amount of 500 μL fetal bovine serum (FBS) was then added to each tube and the samples incubated for 45-55 minutes at 37° C. The FBS was aspirated, and fresh FBS added and the tubes then incubated again for a total of two FBS treatments. Then, 1 mL of PBS was added to each tube for storage of the grafts.

Example 2: Regenerative Potential Assay

The treated nerve tissue samples of Example 1 were evaluated to determine the regenerative potential of the tissue via digestion of basement membrane proteins. A chemically passivated sample was also prepared by chemically treating another nerve tissue sample (Avance® Nerve Graft) to cross link and chemically inactivate proteins involved in neurite growth, for comparison with the digestive enzyme treated and untreated samples. Regenerative potential was determined by a neurite outgrowth measurement (NOM) assay system. The segments were extensively washed to remove any residual enzymes before measurements were taken.

Rat dorsal root ganglia (DRG) cleansed of all roots was placed on each test sample segment and the chemically passivated sample with collagen gel and cultured in a standard medium containing neurobasal media, glutamine, B27, and nerve growth factor (NGF) for seven days to allow for neurite outgrowth. Samples were then fixed and longitudinally sectioned at multiple levels of each segment for histological measurements of neurite extension. Neurite staining was achieved using βIII-tubulin. Neurite outgrowth length was determined from the DRG edge to tip of neurite (average of 3 longest observed across all sections). If no DRG was present it was assumed the DRG dislodged during processing and the sample was not counted.

As a positive control sample, 30% Engelbreth-Holm-Swarm mouse sarcoma cell extracellular matrix-derived gel (EHS gel) in 3 mg/mL collagen I was placed inside an extracellular matrix-based tube (ECM, porcine-derived hollow tube conduit, AxoGuard® Nerve Connector, Axogen, Inc., Alachua, FL, USA). The ECM was hydrated for about 60 minutes. Excess fluid was removed from the ECM tube and then filled with EHS gel and the gel allowed to set. A DRG was then placed on one end of the EHS-filled tube and the segment treated as above for the other samples. Treatment of the various samples is summarized in Table 2. In Table 2, the negative control corresponds to a nerve tissue sample (Avance® Nerve Graft) that did not receive DRG.

TABLE 2

| Group | Standard Media for 7-day Culture | Chemical Fixation Prior to Culture | Digestive Enzymes Treatment Prior to Culture | DRG placed on End of Segment Prior to Culture |
|---|---|---|---|---|
| Protein Digested (PD) | YES | NO | YES | YES |
| Standard (STD) | YES | NO | NO | YES |
| Chemical Passivation (ChemP) | YES | YES | NO | YES |
| Negative Control | YES | NO | NO | NO |
| Positive Control | YES | NO | NO | YES |

Results of the neurite outgrowth assay test are reported in Table 3.

TABLE 3

| Group | Average NOM (μm) +/− SD |
|---|---|
| Trypsin/EDTA-0.25% | 1159 ± 637 |
| Trypsin/EDTA-0.15% | 1207 ± 434 |
| Trypsin/a-chymotrypsin/EDTA-9.25% | 491 ± 250 |
| Trypsin/a-chymotrypsin/EDTA-0.15% | 424 ± 157 |
| Chemically Passivated (10% NBF) | 840 ± 300 |
| Standard Treatment | 1671 ± 716 |

Digestion of the basement membrane proteins with the digestion solutions led to a significant reduction in the extent of neurite outgrowth within the treated nerve tissue samples compared to that of standard nerve tissue samples (controls) that were not treated with a digestion solution. This study suggests that basement membrane proteins such as laminin within a nerve graft supports regenerative capacity of the nerve graft.

As shown in Table 3, digestion of the nerve tissue samples with trypsin/EDTA at 0.15% or 0.25% concentrations, without ACT, did not significantly reduce neurite extension within the treated nerve tissue samples (p>0.05). Treatment of samples with the trypsin/ACT/EDTA solution at 0.15% or 0.25% concentrations led to significant reduction of the regenerative potential of those samples as compared to that of the standard group (p=0.002, p=0.0002, respectively). Treatment with trypsin/ACT/EDTA caused a trend of decreasing regenerative potential of the treated samples compared to the chemically passivated control; however, the regenerative potential difference between the two treatments was not statistically significant (p>0.999). The chemically passivated sample showed a reduced mean neurite extension; the reduction was not statistically significant compared to the standard group (p>0.683) (FIG. 1).

Example 3: Histological Assay

The internal microstructure of the digested samples described in Examples 1 and 2, and a nerve tissue sample treated with 0.25% ACT solution, were evaluated by a histological screening method. This technique assesses geometry of the endoneurial tubes within the nerve segment. The endoneurial tube assessment (ETA) was conducted to determine the perimeter of tubes per 100,000 μm, the number of tubes per 100,000 μm, the percent area of endoneurial tubes, and the total fascicle area ($\mu m^2$). Treatment followed the protocol outlined in Example 1, with the digestion solutions set forth in Table 4 below.

Each segment after treatment was fixed and embedded in paraffin for sectioning. For a negative control, 10 segments were left untreated (control). A cross section from each sample was obtained. Each section was 8 μm thick. Table 4 shows the number of samples in each category of treatment regimen that were analyzed.

TABLE 4

| Group | A | B | C | D |
|---|---|---|---|---|
| Digestion solution | Control | Trypsin/EDTA (0.25%) | Trypsin/ACT/EDTA (0.25%) | ACT (0.25%) |
| # segments | 10 | 10 | 10 | 10 |

Figures 2A, 2B, 2C, 2D:
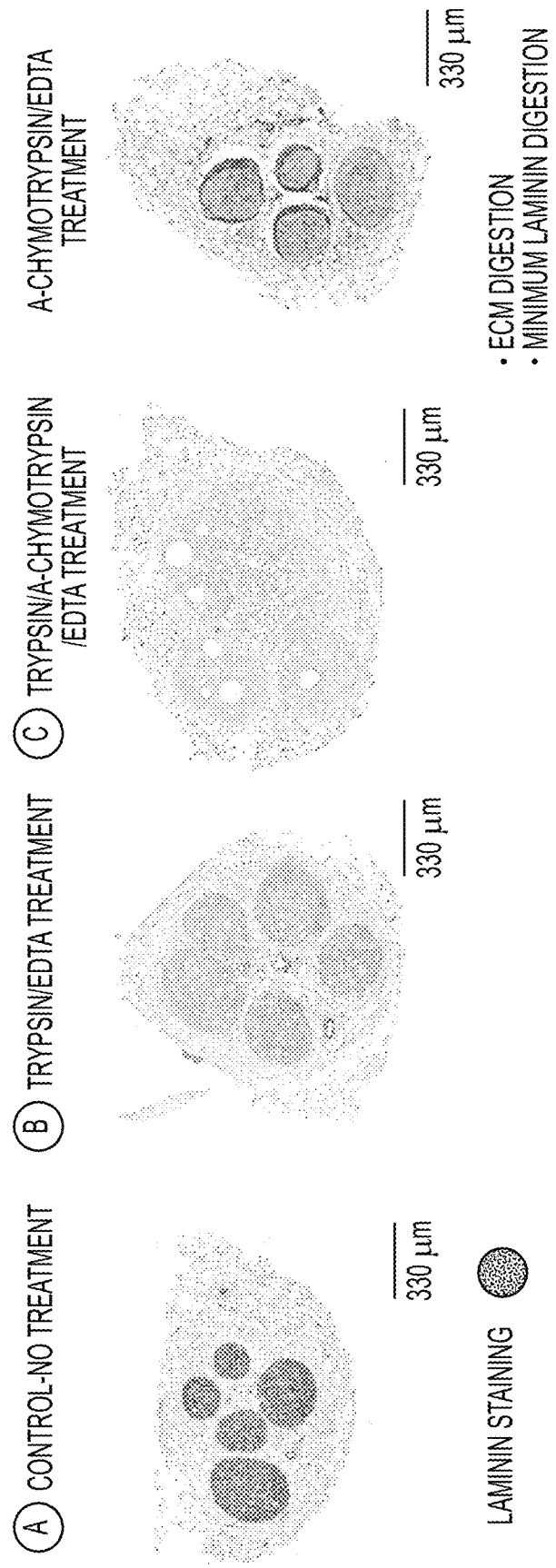
FIGS. 2A-2D are micrograph images of nerve graft samples stained for laminin, as discussed in Example 3.

The cross-sections were each stained with antibody against laminin with results shown in the micrograph images of FIGS. 2A-2D. These images correspond to formalin-fixed paraffin-embedded (FFPE) cross-sections of the laminin-stained samples. Normal endoneurial tube laminin staining was observed within the cross sections of the untreated nerve grafts (FIG. 2A). Treating the nerve graft tissue samples with trypsin/EDTA (FIG. 2B) or trypsin/ACT/EDTA (FIG. 2C) resulted in the removal of detectable and intact laminin protein within the nerve tissue endoneurial tubes; the amount of laminin staining within the endoneurial tubes was reduced following treatment for these samples. Trypsin/EDTA treatment (FIG. 2B) was not observed to result in digestion of the nerve ECM. Minimal digestion of the ECM within the nerve tissue segments treated with trypsin/ACT/EDTA was observed; such ECM digestion was not observed to dissociate the nerve tissue fascicle (FIG. 2C). Treatment with ACT solution resulted in minimal laminin digestion within the endoneurial tubes while affecting the integrity of the ECM surrounding the graft fascicles (FIG. 2D).

The integrity of the internal microstructure of the treated segments was analyzed as well. No statistical difference between the evaluated parameters was detected among the control segments and the trypsin/EDTA or trypsin/ACT/EDTA treated samples. Results are summarized in Table 5 below.

TABLE 5

| Group | Digestion of Laminin within Endoneurial Tubes | Digestion of Nerve ECM outside Endoneurial Tubes |
|---|---|---|
| B: Trypsin/EDTA (0.25%) | Yes | No |
| C: Trypsin/ACT/EDTA (0.25%) | Yes | Minimal |
| D: ACT (0.25%) | Minimal | Partial |

Figures 3A, 3B:
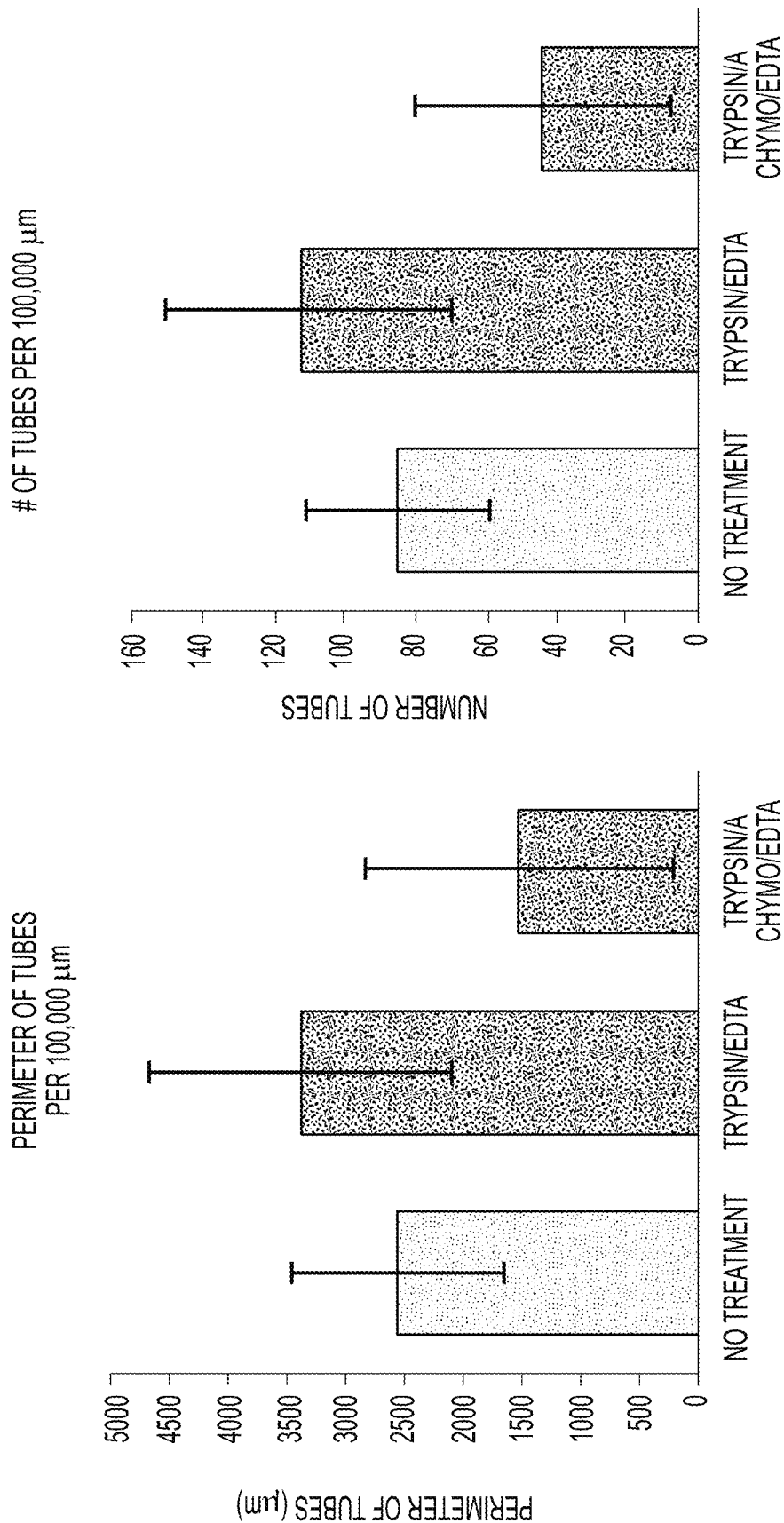
FIGS. 3A-3B are bar graphs of quantitative measurements (perimeter of tubes per 100,000 μm; number of tubes per 100,000 μm) of nerve graft samples, as discussed in Example 3.
Figures 4A, 4B:
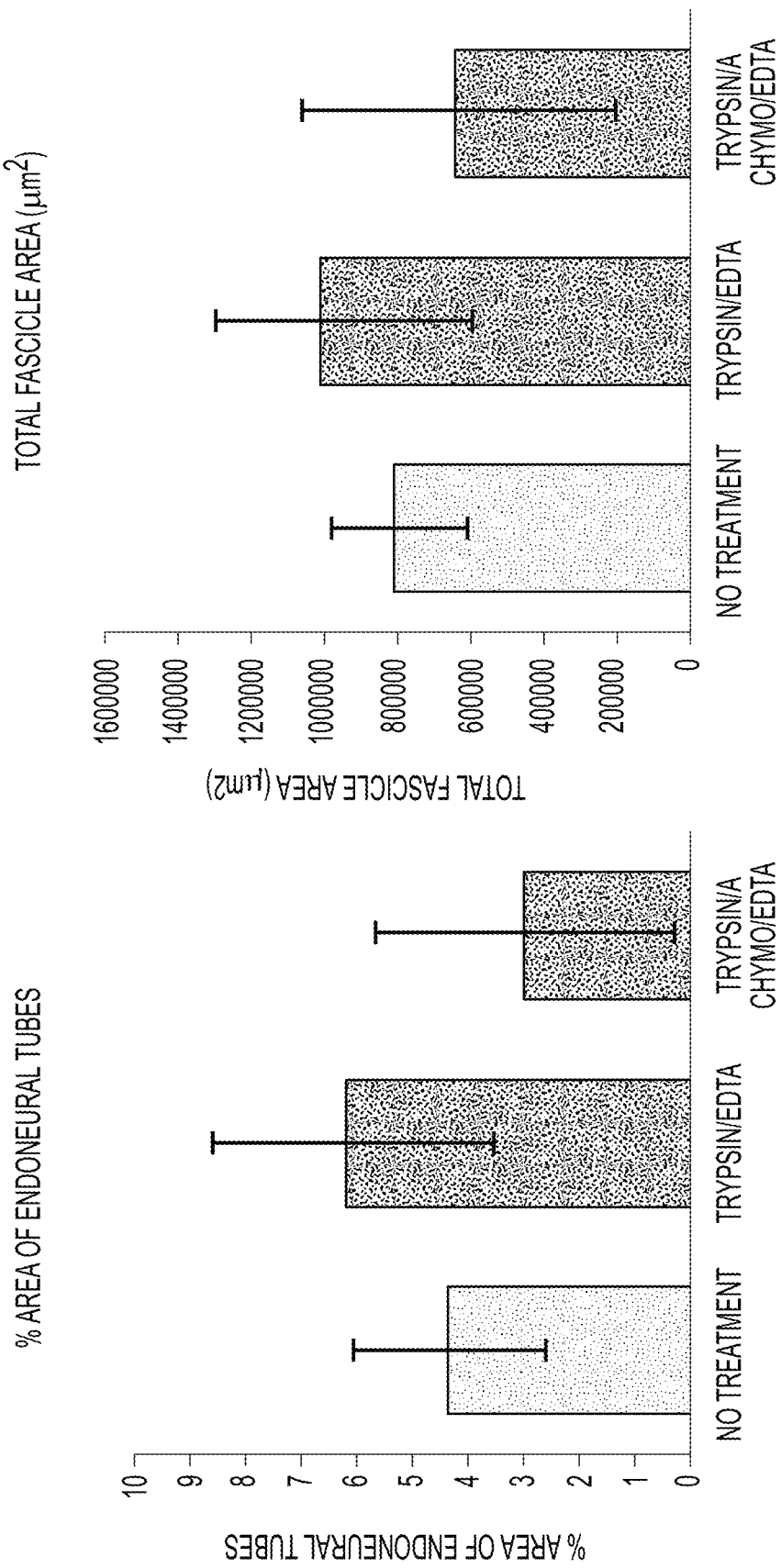
FIGS. 4A-4B are bar graphs of quantitative measurements (percent area of endoneurial tubes; total fascicle area in μm$^2$) of nerve graft samples, as discussed in Example 3.

FIGS. 3A-3B and 4A-4B show bar graphs of the quantitation of microstructures for control and treated samples. FIG. 3A shows the perimeter of sample nerve tissue with the value (μm) expressed in perimeter of tubes per 100,000 μm for untreated sample (control, far left), trypsin/EDTA-treated sample (middle), and trypsin/ACT/EDTA-treated sample (far right). FIG. 3B shows the number of tubes per 100,000 μm for untreated sample (control, far left), trypsin/EDTA-treated sample (middle), and trypsin/ACT/EDTA-treated sample (far right). FIG. 4A shows the percent area of endoneurial tubes for untreated sample (control, far left), trypsin/EDTA-treated sample (middle), and trypsin/ACT/EDTA-treated sample (far right). FIG. 4B shows the total fascicle area in μm² for untreated sample (control, far left), trypsin/EDTA-treated sample (middle), and trypsin/ACT/EDTA-treated sample (far right).

Example 4: Proteomics of Digested Nerve Tissue

Digested samples treated as described in Example 1 were evaluated for the presence of basement membrane proteins associated with neuroregenerative activity of peripheral nerve tissue including active laminin chains, collagen type IV chains, and nidogen. Analysis was achieved by liquid chromatography-selected reaction monitoring (LC-SRM) including stable isotope labeled standards targeted towards ECM proteins of interest.

To perform the proteomics analysis, digested nerve samples and untreated control samples were weighed to 1 mg and dissolved in a basic solution comprising $NH_2OH$, $KCO_3$, and guanidine-HCl to 10 mg/mL. Samples were then incubated with heat and agitation for 28 hours resulting in clarified solutions for most samples.

Figure 5A:
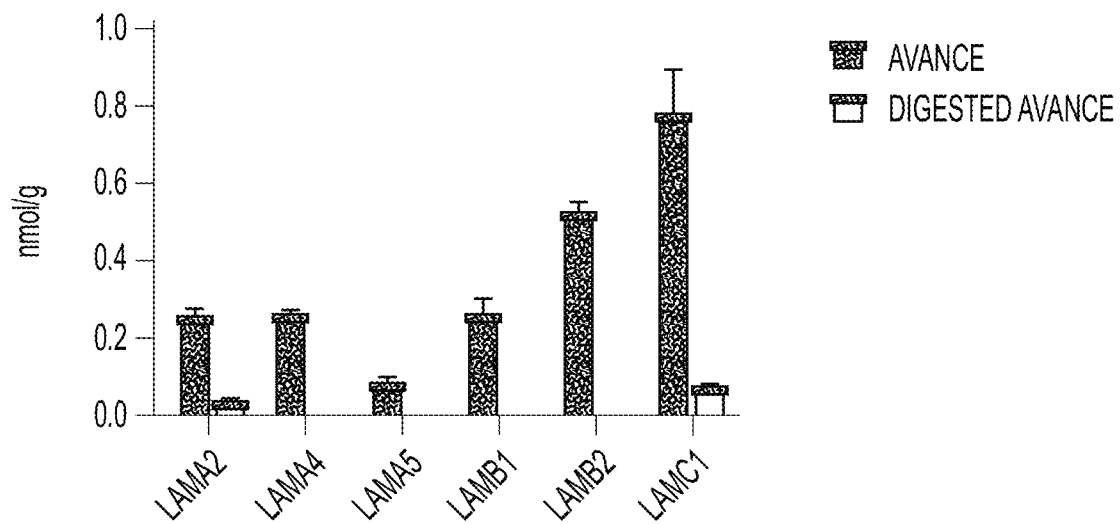
FIGS. 5A-5B are bar graphs depicting the quantitation of basement membrane structural proteins present in treated and untreated nerve tissue samples, as discussed in Example 4.
Figure 5B:
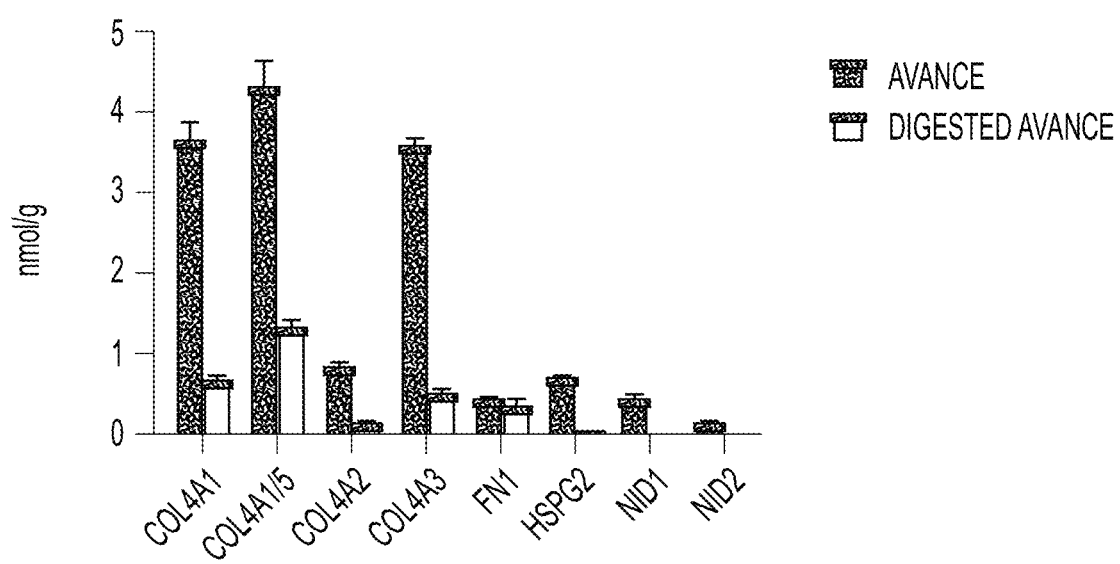

Equal volumes of each sample were combined with a known concentration of ECM standard and subjected to proteolytic digestion with 0.25% trypsin/ACT/EDTA. Resulting peptides were analyzed by LC-SRM ECM assay. Results are shown in FIGS. 5A-5B (treated samples="Digested Avance" and untreated control="Avance"). Treatment of the peripheral nerve tissue with trypsin/ACT/EDTA resulted in a significant reduction of active laminin chains within the basement membrane compared to untreated nerve tissue. The laminin chains include laminin alpha-2, laminin alpha-4, laminin alpha-5, laminin beta-1, laminin beta-2, and laminin gamma-1 (FIG. 5A). In addition, compared to the untreated nerve tissue, the digested samples exhibited a significant reduction in collagen IV chains (collagen alpha-1(IV), collagen alpha-1/5 (IV), collagen alpha-2 (IV), collagen alpha-3 (IV)), fibronectin, perlecan and nidogen (nidogen-1 and nidogen-2) (FIG. 5B). Overall, there was a 10-fold reduction of the tested proteins within the digested samples compared to the untreated nerve tissue.

It should be understood that although the present disclosure has been specifically disclosed by preferred embodiments, exemplary embodiments and optional features, modification and variation of the concepts herein disclosed may be resorted to by those skilled in the art, and that such modifications and variations are considered to be within the scope of this disclosure as defined by the appended claims. The specific embodiments and examples provided herein are non-limiting and illustrative only; it will be apparent to one skilled in the art that the present disclosure may be carried out using a large number of variations of the devices, device components, methods steps set forth in the present description. As will be recognized by one of skill in the art, methods and devices useful for the present methods can include various optional composition and processing elements and steps.

What is claimed is:

1. A method for preparing a nerve graft, the method comprising:
 treating nerve tissue with a digestion solution comprising
 (a) trypsin and alpha-chymotrypsin (ACT), or (b) trypsin, ACT and ethylenediaminetetraacetic acid (EDTA), to substantially remove one or more susceptible proteins from the nerve tissue, wherein the digestion solution comprises one or more of:
 about $3.5 \times 10^3$ USP units/mL to about $4.5 \times 10^3$ USP units/mL of trypsin;
 about 50 USP units/mL to about 55 USP units/mL of ACT; and
 about 1.2 mM to about 1.5 mM of EDTA,
 wherein the treated nerve tissue is substantially free of one or more of laminin alpha-1, laminin alpha-2, laminin alpha-4, laminin alpha-5, laminin beta-1, laminin beta-2, laminin gamma-1, collagen type IV alpha-1 chain, collagen type IV alpha-1/5 chain, collagen type IV alpha-2 chain, collagen type IV alpha-3 chain, fibronectin 1, perlecan, nidogen-1, or nidogen-2.

2. The method of claim 1, wherein the digestion solution further comprises at least one additional proteolytic enzyme.

3. The method of claim 1, wherein the treated nerve tissue comprises one or more of collagen type I alpha-1 chain, collagen type I alpha-2 chain, collagen type VI alpha-3 chain, lumican, collagen type VI alpha-1 chain, collagen type XXVIII alpha-1 chain, dermatopontin, collagen type III alpha-1 chain, collagen type V alpha-3 chain, keratin, type-II cytoskeletal 1, fibrillin-1, decorin, collagen type XVI alpha-1 chain, vitronectin, collagen type XXXI alpha-1 chain, myelin proteins P0, collagen type VI alpha-2 chain, collagen type VIII alpha-1 chain, collagen type V alpha-1 chain, asporin, prolargin, biglycan, collagen type II alpha-1 chain, myelin P2 protein, periostin, collagen type XIV alpha-1 chain, alpha-crystallin B chain, or collagen type XII alpha-1 chain.

4. The method of claim 1, wherein the nerve tissue is treated with the digestion solution at a temperature ranging from about 4° C. to about 40° C.

5. The method of claim 1, wherein the nerve tissue is treated with the digestion solution for a period of time ranging from about 4 hours to about 24 hours.

6. The method of claim 1, further comprising washing the treated nerve tissue with a buffer solution having a pH ranging from about 6.8 to about 7.5.

7. The method of claim 6, wherein the buffer solution comprises phosphate buffered saline, saline catholytes, Tris-buffered saline, cacodylate buffer, Sørensen's phosphate buffer, phosphate-citrate buffer, or barbital buffer.

8. The method of claim 6, wherein the treated nerve tissue is washed with the buffer solution two or more times.

9. The method of claim 6, wherein the treated nerve tissue is washed with the buffer solution for at least one of (a) a temperature ranging from about 4° C. to about 40° C., or (b) for a period of time ranging from about 1 minute to about 4 hours.

10. The method of claim 1, further comprising washing the treated nerve tissue with a serum comprising alpha-antitrypsin and alpha-2-macroglobulin, wherein the serum is fetal bovine serum, rabbit serum, goat serum, horse serum, sheep serum, porcine serum, or chicken serum.

11. The method of claim 10, wherein the treated nerve tissue is washed with the serum two or more times.

12. The method of claim 10, wherein the treated nerve tissue is washed with the serum for at least one of (a) a temperature ranging from about 4° C. to about 40° C., or (b) for a period of time ranging from about 30 minutes to about 8 hours.

13. The method of claim 1, further comprising contacting the treated nerve tissue with a buffer solution and/or a serum, wherein the buffer solution and/or the serum further comprises a calcium channel blocker, extracellular calcium, a glycosaminoglycan, and/or a glycoprotein.

14. The method of claim 13, wherein, as a result of the contacting step, the nerve graft comprises the calcium channel blocker, and wherein the calcium channel blocker comprises one or more of cobalt $Co^{2+}$, manganese $Mn^{2+}$, lanthanum $La^{3+}$, or nitrendipine.

15. The method of claim 13, wherein, as a result of the contacting step, the nerve graft comprises the glycosaminoglycan, and wherein the glycosaminoglycan comprises one or more of keratin sulfate or chondroitin sulfate.

16. The method of claim 13, wherein, as a result of the contacting step, the nerve graft comprises the glycoprotein, and wherein the glycoprotein comprises one or more myelin-associated glycoproteins.

17. The method of claim 1, wherein the nerve graft has a length of about 3 mm to about 100 mm.

18. The method of claim 1, wherein the nerve graft has a diameter of about 1 mm to about 10 mm.

19. The method of claim 1, wherein the nerve graft defines a total volume ranging from about 5 $mm^3$ to about 55,000 $mm^3$.

20. The method of claim 1, wherein the treated nerve tissue is further processed by at least one of lyophilizing the treated nerve tissue, forming a paste out of the treated nerve tissue, or forming a gel out of the treated nerve tissue.

21. The method of claim 1, wherein the nerve tissue is mammalian nerve tissue, selected from the group consisting of human nerve tissue, non-human primate nerve tissue, rodent nerve tissue, equine nerve tissue, canine nerve tissue, rabbit nerve tissue, porcine nerve tissue, ovine nerve tissue or combinations thereof.

22. The method of claim 1, wherein the nerve tissue is synthetic nerve tissue.

23. The method of claim 1, wherein the nerve tissue is non-mammalian nerve tissue, selected from the group consisting of piscine nerve tissue, amphibian nerve tissue, insect nerve tissue and combinations thereof.

24. The method of claim 1, wherein the nerve tissue is selected from the group consisting of peripheral nerve tissue and central nervous system tissue.

25. A nerve graft prepared according to the method of claim 1.

26. A method for preparing a nerve graft, the method comprising:
treating nerve tissue with a digestion solution comprising (a) trypsin, alpha-chymotrypsin (ACT) and ethylenediaminetetraacetic acid (EDTA), or (b) trypsin and ACT, to substantially remove one or more susceptible proteins from the nerve tissue;
wherein the treated nerve tissue is substantially free of one or more of laminin alpha-2, laminin alpha-4, laminin alpha-5, laminin beta-1, laminin beta-2, laminin gamma-1, collagen type IV alpha-1 chain, collagen type IV alpha-1/5 chain, collagen type IV alpha-2 chain, collagen type IV alpha-3 chain, fibronectin 1, perlecan, nidogen-1, or nidogen-2, and
wherein the treated nerve tissue comprises one or more of collagen type I alpha-1 chain, collagen type I alpha-2 chain, collagen type VI alpha-3 chain, lumican, collagen type VI alpha-1 chain, collagen type XXVIII alpha-1 chain, dermatopontin, collagen type III alpha-1 chain, collagen type V alpha-3 chain, keratin, type-II cytoskeletal 1, fibrillin-1, decorin, collagen type XVI alpha-1 chain, vitronectin, collagen type XXXI alpha-1 chain, myelin proteins P0, collagen type VI alpha-2 chain, collagen type VIII alpha-1 chain, collagen type V alpha-1 chain, asporin, prolargin, biglycan, collagen type II alpha-1 chain, myelin P2 protein, periostin, collagen type XIV alpha-1 chain, alpha-crystallin B chain, or collagen type XII alpha-1 chain.

27. The method of claim 26, further comprising washing the treated nerve tissue one or more times with a buffer solution.

28. The method of claim 27, further comprising, after washing with the buffer solution, washing the treated nerve tissue one or more times with a serum comprising alpha-antitrypsin and alpha-2-macroglobulin.

29. The method of claim 26, wherein the nerve tissue is mammalian nerve tissue, selected from the group consisting of human nerve tissue, non-human primate nerve tissue, rodent nerve tissue, equine nerve tissue, canine nerve tissue, rabbit nerve tissue, porcine nerve tissue, ovine nerve tissue or combinations thereof.

30. The method of claim 26, wherein the nerve tissue is non-mammalian nerve tissue, selected from the group consisting of piscine nerve tissue, amphibian nerve tissue, insect nerve tissue and combinations thereof.

31. The method of claim 26, wherein the nerve tissue is selected from the group consisting of peripheral nerve tissue and central nervous system tissue.

32. A method for preparing a nerve graft, the method comprising:
treating nerve tissue with a digestion solution comprising (a) trypsin and alpha-chymotrypsin (ACT), or (b) trypsin, ACT, and ethylenediaminetetraacetic acid (EDTA), to substantially remove one or more susceptible proteins from the nerve tissue; and
washing the treated nerve tissue with a serum comprising alpha-antitrypsin and alpha-2-macroglobulin, wherein the serum is fetal bovine serum, rabbit serum, goat serum, horse serum, sheep serum, porcine serum, or chicken serum,
wherein the treated nerve tissue is substantially free of one or more of laminin alpha-1, laminin alpha-2, laminin alpha-4, laminin alpha-5, laminin beta-1, laminin beta-2, laminin gamma-1, collagen type IV alpha-1 chain, collagen type IV alpha-1/5 chain, collagen type IV alpha-2 chain, collagen type IV alpha-3 chain, fibronectin 1, perlecan, nidogen-1, or nidogen-2.

33. The method of claim 32, wherein the digestion solution further comprises at least one additional proteolytic enzyme.

34. The method of claim 32, wherein the treated nerve tissue comprises one or more of collagen type I alpha-1 chain, collagen type I alpha-2 chain, collagen type VI alpha-3 chain, lumican, collagen type VI alpha-1 chain, collagen V alpha-3 chain, keratin, type-II cytoskeletal 1, fibrillin-1, decorin, collagen type XVI alpha-1 chain, vitronectin, collagen type XXXI alpha-1 chain, myelin proteins P0, collagen type VI alpha-2 chain, collagen type VIII alpha-1 chain, collagen type V alpha-1 chain, asporin, prolargin, biglycan, collagen type II alpha-1 chain, myelin P2 protein, periostin, collagen type XIV alpha-1 chain, alpha-crystallin B chain, or collagen type XII alpha-1 chain.

35. The method of claim 32, wherein the nerve tissue is treated with the digestion solution at a temperature ranging from about 4° C. to about 40° C.

36. The method of claim 32, wherein the nerve tissue is treated with the digestion solution for a period of time ranging from about 4 hours to about 24 hours.

37. The method of claim 32, further comprising washing the treated nerve tissue with a buffer solution having a pH ranging from about 6.8 to about 7.5.

38. The method of claim 32, wherein the nerve tissue is mammalian nerve tissue, selected from the group consisting of human nerve tissue, non-human primate nerve tissue, rodent nerve tissue, equine nerve tissue, canine nerve tissue, rabbit nerve tissue, porcine nerve tissue, ovine nerve tissue or combinations thereof.

39. The method of claim 32, wherein the nerve tissue is non-mammalian nerve tissue, selected from the group consisting of piscine nerve tissue, amphibian nerve tissue, insect nerve tissue and combinations thereof.

40. The method of claim 32, wherein the nerve tissue is synthetic nerve tissue.

41. The method of claim 32, wherein the nerve tissue is selected from the group consisting of peripheral nerve tissue and central nervous system tissue.

42. A method for preparing a nerve graft, the method comprising:
treating nerve tissue with a digestion solution comprising (a) trypsin and alpha-chymotrypsin (ACT), or (b) trypsin, ACT, and ethylenediaminetetraacetic acid (EDTA), to substantially remove one or more susceptible proteins from the nerve tissue; and
further processing the treated nerve tissue by at least one of lyophilizing the treated nerve tissue, forming a paste out of the treated nerve tissue, or forming a gel out of the treated nerve tissue,
wherein the treated nerve tissue is substantially free of one or more of laminin alpha-1, laminin alpha-2, laminin alpha-4, laminin alpha-5, laminin beta-1, laminin beta-2, laminin gamma-1, collagen type IV alpha-1 chain, collagen type IV alpha-1/5 chain, collagen type IV alpha-2 chain, collagen type IV alpha-3 chain, fibronectin 1, perlecan, nidogen-1, or nidogen-2.

43. The method of claim 42, wherein the digestion solution further comprises at least one additional proteolytic enzyme.

44. The method of claim 42, wherein the treated nerve tissue comprises one or more of collagen type I alpha-1 chain, collagen type I alpha-2 chain, collagen type VI alpha-3 chain, lumican, collagen type VI alpha-1 chain, collagen V alpha-3 chain, keratin, type-II cytoskeletal 1, fibrillin-1, decorin, collagen type XVI alpha-1 chain, vitronectin, collagen type XXXI alpha-1 chain, myelin proteins P0, collagen type VI alpha-2 chain, collagen type VIII alpha-1 chain, collagen type V alpha-1 chain, asporin, prolargin, biglycan, collagen type II alpha-1 chain, myelin P2 protein, periostin, collagen type XIV alpha-1 chain, alpha-crystallin B chain, or collagen type XII alpha-1 chain.

45. The method of claim 42, wherein the nerve tissue is treated with the digestion solution at a temperature ranging from about 4° C. to about 40° C.

46. The method of claim 42, wherein the nerve tissue is treated with the digestion solution for a period of time ranging from about 4 hours to about 24 hours.

* * * * *

UNITED STATES PATENT AND TRADEMARK OFFICE
CERTIFICATE OF CORRECTION

| | | |
|---|---|---|
| PATENT NO. | : 12,440,603 B2 | Page 1 of 1 |
| APPLICATION NO. | : 17/411718 | |
| DATED | : October 14, 2025 | |
| INVENTOR(S) | : Jennifer Faleris and Kasra Tajdaran | |

It is certified that error appears in the above-identified patent and that said Letters Patent is hereby corrected as shown below:

In the Claims

Claim 34, Column 20, Line 49, after "collagen" insert --type XXVIII alpha-1 chain, dermatopontin, collagen type III alpha-1 chain, collagen type--.

Claim 44, Column 22, Line 12, after "collagen" insert --type XXVIII alpha-1 chain, dermatopontin, collagen type III alpha-1 chain, collagen type--.

Signed and Sealed this
Thirtieth Day of December, 2025

John A. Squires
*Director of the United States Patent and Trademark Office*